United States Patent Office 2,847,397
Patented Aug. 12, 1958

2,847,397

PROCESS OF POLYCONDENSATION OF DIOL-ESTERS OF AROMATIC DICARBOXYLIC ACIDS

Johannes Kleine, Munich, and Erhard Siggel, Laudenbach (Main), Germany, assignors to Vereinigte Glanzstoff-Fabriken Aktiengesellschaft, Wuppertal-Elberfeld, Germany, a joint-stock company of Germany No Drawing. Application December 22, 1953
Serial No. 399,823

Claims priority, application Germany December 24, 1952

3 Claims. (Cl. 260—75)

This invention relates to the polycondensation of diolesters which, if subjected to polycondensation have long been known to be useful in the fabrication of artificial threads and fibers, of aromatic dicarboxylic acids and quite especially to the diolesters of the terephthalic acid.

In a prior application for patent of the United States a process was described for the polycondensation of diolesters of the acids mentioned above, according to which the diolesters are dissolved in certain solvents and subjected to polycondensation in these solutions. The solvents used in that process are organic compounds containing in their molecules two cyclic nuclei which are connected with each other either directly or by O—, CO— or $(CH_2)_n$ groups (in which $n$ may be 1–4) and which may be hydrogenated partly or altogether. The cyclic nuclei in these compounds may be substituted by $CH_3$—, $CH_3O$—, $C_2H_5$—, $C_2H_5O$—, $C_3H_7$—, $C_3H_7O$— or the like groups, but should not contain any OH, $NH_2$—, NO—, CN— or COOH— groups. They shall boil above 180° C. and shall form with the diol separated in the condensation reaction an azeotropic mixture which can continuously be removed from the reaction zone. The solvents there used dissolve not only the monomeric diolesters, but also their polycondensates. Methylnaphthalene, diphenyl, diphenyloxide and diphenylmethane as well as mixtures of these compounds were mentioned as examples of these solvents.

In the polycondensation of ethyleneglycol esters of the terephthalic acid, as hitherto performed in molten condition, the temperature had to be raised up to 280° C. At such temperatures the polycondensates are already exposed to undesirable changes, for instance by the formation of ether bridges or by cracking, accompanied by yellow coloring of the condensates. Polycondensation of esters of aromatic dicarboxylic acid in solvents influencing the formation of azeotropic compounds, for instance diphenylmethane (B. P. 261° C.), diphenyl (B. P. 254° C.), diphenyloxide (B. P. 252° C.), methylnaphthalene (B. P. 247.5° C.) occurs at a temperature of the order of the boiling points. For instance if α-methylnaphthalene is used as the solvent, the condensation temperature required for removing in the last phase of the reaction the last traces of glycol from a solution of say, 50% by weight polyethylene terephthalate, lies at about 260° C. Although in this case the condensate takes place under particularly favorable conditions, the products are still affected with a light yellow discoloration.

We have now found that it is possible to obtain high grade polycondensation products of esters of aromatic dicarboxylic acids of almost pure white color, if the condensation for instance of ethyleneglycol esters of terephthalic acid or their precondensates is carried through in a mixture of one or more solvents and swelling agents and/or non-solvents which can distil over with the split-off diol as an azeotropic mixture.

We prefer to operate within a range of temperatures below 250° C., and more particularly 240–200° C.

The polycondensation can be carried within this favorable range, if to the solvents and solvent mixtures mentioned above are added other organic media boiling below 250° C. To the solvent or solvent mixture is added such an amount of an organic compound boiling below 250° C. that the resulting mixture boils in any case below 250° C. and the polycondensation can be carried through also below that temperature and preferably between 240° and 200° C.

These added organic compounds need not have the property of solvents, but may be swelling agents or non-solvents such as for instance paraffin hydrocarbons. However, the addition of non-solvents should be limited to a percentage at which there is no danger of the polyesters or the starting products being precipitated from the solution at the reaction temperature.

It is a prerequisite for the addition of such organic compounds that they reduce the boiling temperature to the lower range indicated above and that they form an azeotropic mixture with the compound, such as the glycol, which is split off in the reaction.

For reasons of heat economy it is particularly advantageous to use low boiling organic compounds which distil over as parts of an azeotropic mixture with the glycol split off, however, not with the higher boiling component serving as the solvent.

As a rule it is recommendable to operate in solutions which during the final stage have a concentration of about 50%. Thanks to the great difference of the boiling points of the two components the separation of the lower boiling azeotropic compounds after the end of the condensation is easy and a high concentration solution thus be obtained.

We have found that paraffin hydrocarbons boiling within the range of 140° and 240° C., such as for instance n-decane and its homologs are particularly useful azeotropic partners. There are useful also benzine fractions with a high percentage of paraffin hydrocarbons and naphthenes and a boiling point within the range of 140° and 225° C., preferably between 180° and 220° C., and also non-solvents such as for instance xylene.

A lower limit to the boiling point of the mixture of solvents is necessitated by the fact that the speed of reaction in the polycondensation process diminishes, as the temperature drops. It is therefore important that the reaction temperature be as high as possible in order to provide for a speed of reaction commensurate with the practical requirements of a continuous operation. For this reason the boiling point of the mixture of solvents and the temperature of reaction should not be lower than 180° C.

Obviously our new process is not limited to the production of diolesters of terephthalic acid. It can be applied generally to the polycondensation of any aromatic carboxylic acid.

In the operation of our process we have for instance proceeded as follows:

*Example 1*

A mixture of 124 g. terephthalic acid glycolester, 90 g. methylnaphthalene and 70 g. xylene was heated in the presence of 0.1 g. lead acetate, acting as catalyst, to boiling point in a vessel covered with an ordinary still head. The condensation temperature was 208–210° C. The azeotropic mixture of glycol and xylene to be driven over was freed from the glycol, so that the xylene could be returned directly into the hot solution.

The resulting colorless polyethylene terephthalate melted at 247.5–249° C.

Various changes may be made in the reaction materials

We claim:

1. Process for producing polymerized glycol esters of terephthalic acid of high purity which comprises heating the monomeric ester and a condensation catalyst at a temperature of about 200° to 240° C. in a mixture of about 60 percent of an inert solvent for the polymer selected from the group consisting of diphenylmethane, diphenyl oxide, diphenyl and methyl-naphthalene, and about 40 percent of a hydrocarbon nonsolvent boiling in the range of about 140° to 240° C., both of said solvent and non-solvent being capable of forming an azeotrope with excess glycol split off during the condensation, and removing the azeotrope of glycol, inert solvent, and nonsolvent.

2. The process of claim 1 in which the nonsolvent is a member selected from the group consisting of monocyclic aromatic, naphthenic, and paraffin hydrocarbons.

3. Process for producing polymerized ethylene glycol terephthalate of high purity which comprises heating the monomeric ester and a condensation catalyst at a temperature of about 208–210° C. in a mixture of about 60 percent of methyl-naphthalene and about 40 percent xylene, and removing the azeotrope of ethylene glycol and the two hydrocarbons which is formed.

References Cited in the file of this patent

UNITED STATES PATENTS

| | | |
|---|---|---|
| 2,597,643 | Izard et al. | May 20, 1952 |
| 2,646,420 | Morgan | July 21, 1953 |
| 2,706,722 | Caldwell | Apr. 19, 1955 |